US007098921B2

(12) United States Patent
Nash et al.

(10) Patent No.: US 7,098,921 B2
(45) Date of Patent: Aug. 29, 2006

(54) METHOD, SYSTEM AND COMPUTER PROGRAM PRODUCT FOR EFFICIENTLY UTILIZING LIMITED RESOURCES IN A GRAPHICS DEVICE

(75) Inventors: Reuel W Nash, Newark, CA (US); Mark A Young, Sunnyvale, CA (US); Charles Labarre, Sunnyvale, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 157 days.

(21) Appl. No.: 09/904,541

(22) Filed: Jul. 16, 2001

(65) Prior Publication Data

US 2002/0109682 A1 Aug. 15, 2002

Related U.S. Application Data

(60) Provisional application No. 60/267,434, filed on Feb. 9, 2001.

(51) Int. Cl.
*G06F 1/20* (2006.01)
*G06F 7/38* (2006.01)
*G06F 9/00* (2006.01)
*G06F 9/44* (2006.01)
*G06F 15/00* (2006.01)

(52) U.S. Cl. ...................................... 345/506; 712/245

(58) Field of Classification Search ................ 708/520; 345/522, 426, 1.1, 422, 505, 568, 558, 600, 345/685, 563, 419, 607; 712/239, 200, 248, 712/23, 215, 209, 216, 245; 711/141, 118; 714/35

See application file for complete search history.

(56) References Cited

U.S. PATENT DOCUMENTS 5,398,321 A * 3/1995 Jeremiah ..................... 712/216

(Continued)

FOREIGN PATENT DOCUMENTS

EP      0 395 958 A2    11/1990

(Continued)

OTHER PUBLICATIONS

Copy of Written Opinion for International Application No. PCT/US01/41494, issued on Jun. 26, 2003.

(Continued)

*Primary Examiner*—Kee M. Tung
*Assistant Examiner*—Dalip K. Singh
(74) *Attorney, Agent, or Firm*—Christie, Parker & Hale, LLP

(57) ABSTRACT

A memory management system provides microcode instructions that are divided into multiple tuned phases and stored as separate modules inside a phase code depository. A microcode manager, containing a mode detector, sequence identifier, code loader, drawing data processor and phase executor, interacts with a microcode processor and the phase code depository. The mode detector evaluates a user request for a desired mode. In response to a command from the mode detector, the sequence identifier selects a correct phase sequence that is needed to implement the desired mode. The code loader transfers the phase sequence from the phase code depository to the microcode processor where it is stored in a microcode instruction memory. The memory address for each module within the phase sequence is written to a microcode data memory. The drawing data for the graphics mode is sent from the drawing data processor to the microcode processor, and the phase executor instructs the microcode processor to execute the phase sequence to render the desired mode by processing the drawing data. The resulting data is forwarded to another processor for additional microcode processing, vector processing, rasterization, or the like. The ability to select interchangeable phase modules to implement a desired mode reduces microcode memory requirements and allows easy integration and reuse of previously developed features among different games and other graphics software developers without having to rely on the type of platform.

28 Claims, 9 Drawing Sheets

U.S. PATENT DOCUMENTS

| | | | |
|---|---|---|---|
| 5,813,026 A | 9/1998 | Borg et al. | 711/115 |
| 5,914,724 A * | 6/1999 | Deering et al. | 345/607 |
| 5,923,338 A | 7/1999 | Rich | |
| 6,198,488 B1 * | 3/2001 | Lindholm et al. | 345/426 |
| 6,219,071 B1 | 4/2001 | Krech, Jr. et al. | 345/503 |

FOREIGN PATENT DOCUMENTS

| | | |
|---|---|---|
| EP | 0 498 454 A2 | 8/1992 |
| EP | 0 519 071 A1 | 12/1992 |
| EP | 0 969 362 A2 | 1/2000 |
| EP | 1 011 043 A2 | 6/2000 |

OTHER PUBLICATIONS

International Search Report for Appln. No. PCT/US01/41494 issued Aug. 1, 2001, 7 pages.

* cited by examiner

Phase Module Sequence A

Phase Module Sequence B

METHOD, SYSTEM AND COMPUTER PROGRAM PRODUCT FOR EFFICIENTLY UTILIZING LIMITED RESOURCES IN A GRAPHICS DEVICE

BACKGROUND OF THE INVENTION

1. Field of the Invention

The present invention relates generally to memory management, and more particularly to improving the performance of microcoded functionality.

2. Related Art

Conventional applications for computer graphics use a microcode engine to prepare the instructions to render various graphics modes. To increase the processing speed, the microcode instructions (i.e., microinstructions) include loop routines that are used to execute the rendering instructions. The loop routines are unrolled to reschedule or tune the microinstructions. A direct correlation can be observed between the complexity of graphics programs and the number of required routines. In short as graphics programs become more advanced and sophisticated, a substantial number of lines of microinstructions are needed to render various graphic modes. However, microcode engines tend to have limited random access memory (RAM) capacity. Once RAM is consumed, more processing time or a faster processor is required to support highly advanced graphics, including animation, gaming and other simulations.

Tuning techniques are often used to improve performance and expand the capabilities of microcode engines. This improves the performance of microcoded transformations, lighting, and other graphics effects. However, most graphics applications have the ability to use several modes to render display frames. Each mode has the potential to contain various combinations of graphics effects, and each mode would require specifically tuned microinstructions to draw the effects. In general, there is not enough microcode memory space to have monolithic tuned rendering microcode for each mode that an application may want to use. Microcode branch instructions can be used to allow a single monolithic rendering code to work in several modes, but at the expense of extreme complexity in applying tuning techniques to maintain reasonable processing requirements for real time environments.

Microinstructions are also dependent upon the platform being used to run the graphics program. The microcode capabilities of each graphics system, including its system and language related run-time libraries, vary and effect the efficiency and performance of the applications loaded onto the graphics system. Software developers for new graphics applications must consider the version, performance, and capabilities of these platforms when they build their applications. Otherwise, new video games, for example, either would not be able to use the microcode developed for the existing platform, or would not take full advantage of the microcode capabilities.

What is needed is a method and system that overcome the above problems to efficiently manage microcode independent of the hardware and operating system.

SUMMARY OF THE INVENTION

A microcode management system improves the performance and expands the capabilities of graphics software to use more tuning techniques and conserve limited memory on any type of computer platform. Rendering code for a microcode processor is assembled in one or more phases. Well-tuned versions of each phase are stored as distinct modules into a phase code depository for quick and easy access.

A microcode manager contains various components designed to select a correct sequence of phases that are needed to implement a desired graphics mode. The components include a mode detector, sequence identifier, code loader, drawing data processor, and phase executor.

The mode detector evaluates a user request for the desired graphics mode. In response to a command from the mode detector, the sequence identifier selects the correct phase sequence. The code loader transfers the phase sequence from the phase code depository to a microcode processor where it is temporarily stored in a microcode instruction memory. The memory address for each module within the phase sequence is written to a microcode data memory.

The drawing data processor supplies vertices and vertex data to the microcode processor, and the phase executor instructs the microcode processor to execute the phase sequence to process the vertices and vertex data to render the desired graphics mode. The resulting data is forwarded to another processor for additional microcode processing, vector processing, rasterization, or the like.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

Table of Contents

I. Overview of Microcode Management System

II. Microcode Management

III. Phase Module Sequencing

IV. Phase Module Attributes

V. System Operation

VI. Software and Hardware Embodiments

VII. Conclusion

I. Overview of Microcode Management System

Figure 1:
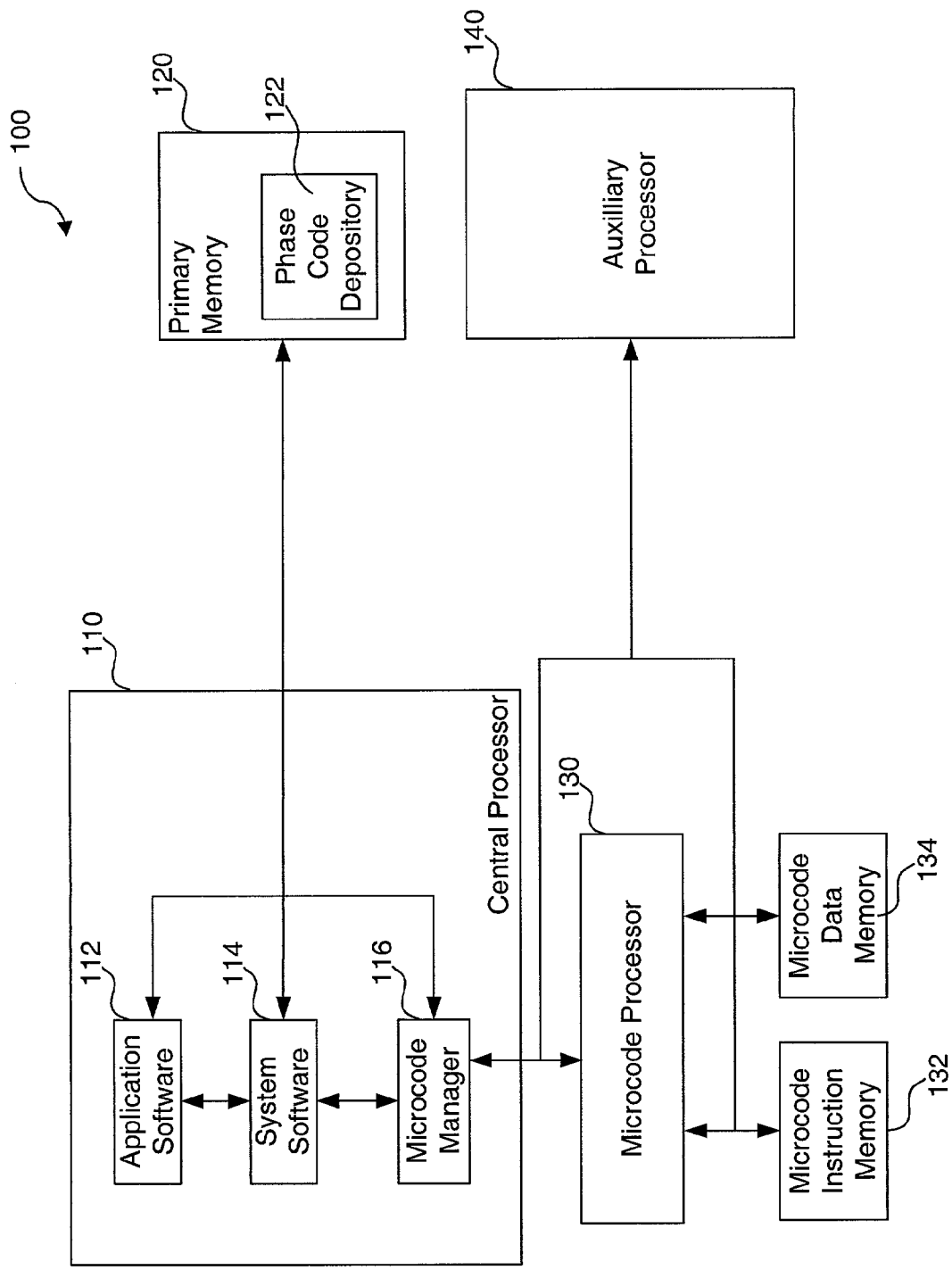
FIG. 1 illustrates a block diagram of a microcode management system according to an embodiment of the present invention.

FIG. 1 illustrates, according to an embodiment of the present invention, a block diagram of a microcode management system 100. As shown, microcode management system 100 includes a central processor 110, primary memory 120, microcode processor 130, microcode instruction memory 132, microcode data memory 134, and auxiliary processor 140. Central processor 110, microcode processor 130, and auxiliary processor 140 represent any commonly known or future-developed computer processor. Central processor 110 can be any processor developed by Intel Corporation, Advanced Micro Devices, Inc. (AMD), API NetWorks (Alpha), ARM Ltd., MIPS Technologies, Inc, or the like. In an embodiment, central processor 110 is the Emotion engine, available from Sony Computer Entertainment America Inc., that provides motion simulation capability for animation or gaming applications, including the Playstation® 2 entertainment system available from Sony Computer Entertainment America Inc. In an embodiment, microcode processor 130 is a vector processor capable of handling over eight floating-point operations at a given time.

Operating on central processor 110 are application software 112, system software 114, and microcode manager 116. Application software 112 can be any currently available or future developed application, including, but not limited to, a game, word processing, presentation, spreadsheet, graphics, or the like. The formats supported by the application software 112 includes, but are not limited to, Virtual Reality Modeling Language (VRML) for three dimensional graphics, GIF for graphics, JPEG for photographs, the Quick-Time® software available from Apple Computer, Inc. for dynamic media (i.e., audio and video), the Macromedia® Flash™ software available from Macromedia, Inc. for simple animation, the Macromedia® Shockwave® software available from Macromedia, Inc. for more advanced animation, the Adobe® Acrobat® software available from Adobe Systems Incorporated for documents, the Intrinsic Alchemy™ software available from Intrinsic Graphics, Inc. for gaming, or the like.

System software 114 includes software for application program interfaces, browsers or operating systems, and interacts with other components of system 100 to implement the instructions from application software 112. In an embodiment, system software 114 includes the browser software, such as the Netscape® browser available from AOL/Netscape Communications, the Microsoft® Internet Explorer browser available from Microsoft Corporation, or the like, that is capable of handling Java, Java Script, C, C++, or like programming languages. In an embodiment, system software 114 includes operating software, such as, the NetWare™ operating system available from Novell®; the MS-DOS®, Windows NT® or Windows® 3.xx/95/98/2000 operating systems available from Microsoft Corporation; the Linux® operating system available from Linux Online Inc.; the Solaris™ operating system available from Sun Microsystems, Inc.; or the like. In an embodiment, system software 114 is the Intrinsic Alchemy™ software available from Intrinsic Graphics, Inc., which can be used to develop video games for personal computers, consoles, television set-top boxes, the Internet, wireless handheld devices, or real-time three dimensional graphic applications, such as a flight simulator for pilot training. In an embodiment, system software 114 is the OpenGL® application program interface, available from Silicon Graphics, Inc. In an embodiment, system software 114 is the DirectX® suite of multimedia application program interfaces available from Microsoft Corporation.

Microcode manager 116, discussed in greater detailed below, serves as an interface between microcode processor 130 and various components within central processor 110. In an embodiment, microcode manager 116 is a software application loaded or operating as a separate module in central processor 110. In another embodiment, microcode manager 116 is loaded into or operating as a part of system software 114. Microcode manager 116 primarily receives signals from system software 114 and interacts with microcode processor 130. Microcode processor 130 executes commands from microcode manager 116 as a sequence of microcode instructions (i.e., microinstructions). In an embodiment, the microinstructions are written specifically for the Vector Unit (VU0 or VU1) in a Playstation® 2 system.

Central processor 110 (including its components application software 112, system software 114, and microcode manager 116) has access to primary memory 120. Primary memory 120 contains data, instructions, state variables or the like that are required by central processor 110 or its components to carry out various functions. Specifically, primary memory 120 includes a phase code depository 122 that stores microinstructions that are delivered to microcode processor 130 for execution.

Similarly, microcode processor 130 has access to microcode instruction memory 132 and microcode data memory 134 which store data, instructions, state variables, or the like that are necessary for microcode processor 130 to function as designed. Microcode instruction memory 132 stores a sequence of microinstructions. Microcode data memory 134 stores a sequence list which is a compilation of addresses to the sequences listed in microcode instruction memory 132 in addition to other information required by microcode processor 130 and/or the microinstructions. Thus, microcode data memory 134 is queried to ascertain the location of a specific group of microinstructions stored in microcode instruction memory 132.

Primary memory 120, microcode instruction memory 132, and microcode data memory 134 can be a component of a main memory, a secondary memory, or a memory cache. Although FIG. 1 shows microcode processor 130 interacting directly with microcode instruction memory 132 and microcode data memory 134, in another embodiment, central processor 110 interacts directly with microcode instruction memory 132 and/or microcode data memory 134 to supply information to microcode processor 130, or for operations independent of microcode processor 130.

As shown, microcode data memory 134 and microcode instruction memory 132 are located externally to microcode processor 130. However, in another embodiment, microcode data memory 134 and microcode instruction memory 132 are internal components of microcode processor 130. In this embodiment, microcode processor 130, microcode data memory 134, and microcode instruction memory 132 are integrated into a single device.

Auxiliary processor 140 provides additional microcode processing, pixel processing, rasterization, vector processing, or the like. Microcode processor 130 directly communicates with auxiliary processor 140. However, in another embodiment, such communications are filtered or controlled through central processor 110.

In an embodiment, microcode instruction memory 132 and/or microcode data memory 134 interacts directly with auxiliary processor 140. For example, auxiliary processor 140 can be another microcode processor 130, and hence, the present invention is adaptable to support multiple microcode processors 130 simultaneously. Moreover in an embodiment, auxiliary processor 140 is another microcode processor 130 that is coupled to its own microcode instruction memory 132 and microcode data memory 134. In this embodiment, microcode manager 116 provides centralized control of multiple microcode processors 130.

II. Microcode Management

Figure 2:
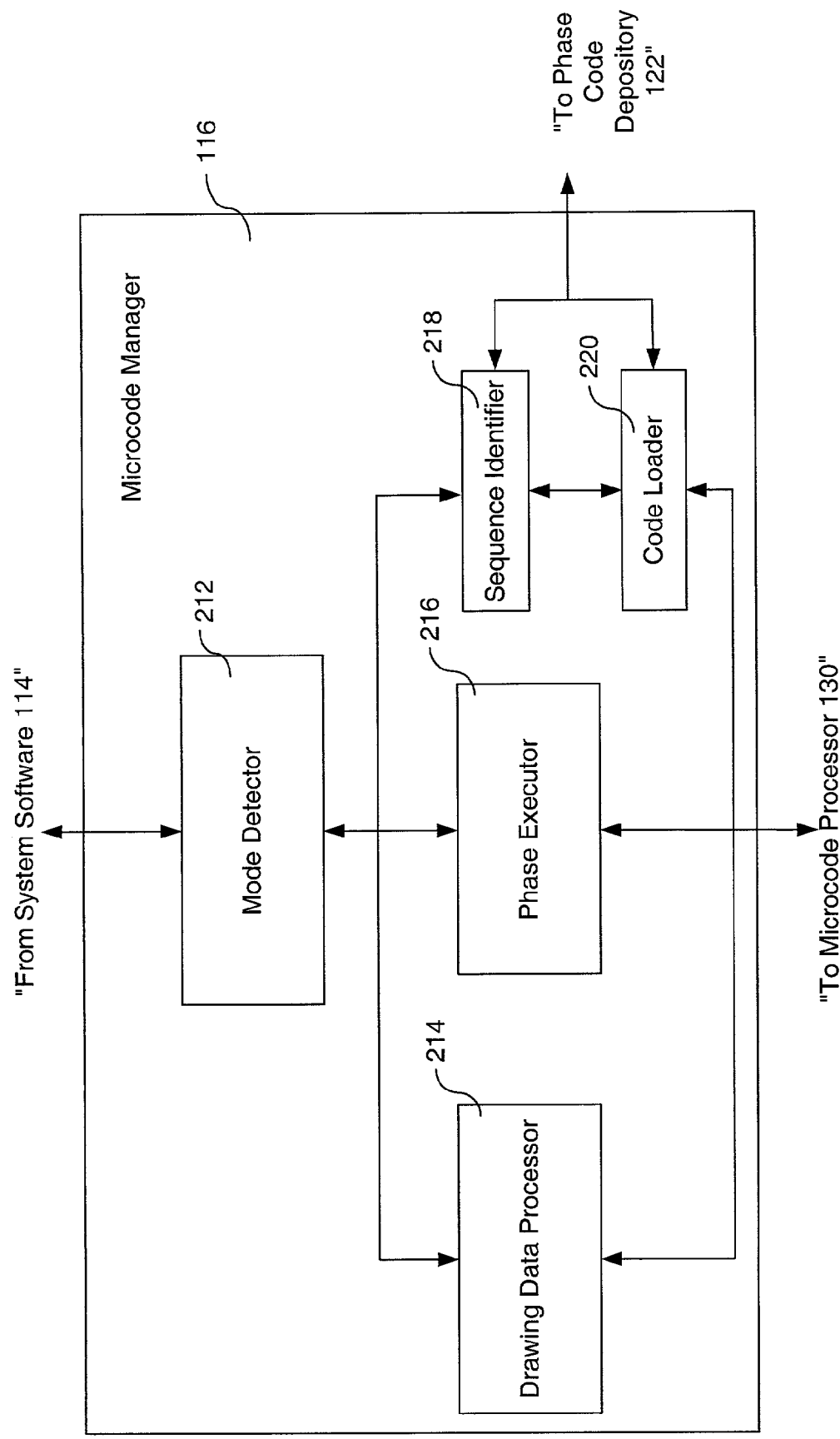
FIG. 2 illustrates a block diagram of a microcode manager according to an embodiment of the present invention.

FIG. 2 illustrates a block diagram of microcode manager 116 according to an embodiment of the present invention. Microcode manager 116 includes a mode detector 212, drawing data processor 214, phase executor 216, sequence identifier 218, and code loader 220. Mode detector 212 receives a signal from system software 114. After processing the signal, mode detector 212 exchanges communications with drawing data processor 214, phase executor 216, sequence identifier 218 and/or code loader 220, as required.

Based on a signal received from mode detector 212, drawing data processor 214 sends drawing data to microcode processor 130. The drawing data includes vertices and vertex data used to draw primitives (e.g., points, line segments, and polygon) on a display. Vertex data includes coordinates, colors, normals, texture coordinates, edge flags, or the like.

Phase executor 216, sequence identifier 218 and code loader 220 also exchange communications with mode detector 212 and microcode processor 130. Based on a signal received from mode detector 212, sequence identifier 218 determines or selects the appropriate microinstructions to be executed by microcode processor 130. Sequence identifier 218 also signals code loader 220 to load the microinstructions into microcode processor 130. Phase executor 216 primarily functions to command microcode processor 130 to process the microinstructions according to a predetermined sequence.

In an embodiment, microinstructions for performing certain tasks are grouped in respective phase modules or functions. Sequence identifier 218 then selects an appropriate set and sequence of phase modules. An example of phase modules selection and sequencing of phase modules in a graphics environment according to the present invention is described below in further detail with respect to FIGS. 3–7.

As discussed, microinstructions are stored in phase code depository 122. Therefore, code loader 220 queries phase code depository 122 to select the appropriate microinstructions and send them to microcode instruction memory 132. Alternatively, code loader 220 can command phase code depository 122 to send the microinstructions directly to microcode instruction memory 132. In an embodiment, code loader 220 does not directly communicate with microcode instruction memory 132. As such, the microinstructions are delivered to microcode processor 130 to route the microinstructions to microcode instruction memory 132.

As discussed, microcode data memory 134 records the memory addresses of the phase modules located in microcode instruction memory 132. Accordingly, code loader 220 also ensures that the memory addresses for the phase modules are written to microcode data memory 134.

Code loader 220 also manages the memory pool within microcode instruction memory 132 and/or microcode data memory 134. As such, code loader 220 audits and removes or overwrites microinstructions and/or other data from microcode instruction memory 132 and/or microcode data memory 134 when the contents of the memories exceed certain capacity restrictions. Upon reaching the capacity restrictions, code loader 220 discards or overwrites the unused microinstructions on a first-in-first-out basis. In other words, code loader 220 would go to the beginning of the memory and start to overwrite the unused microinstructions. In an embodiment, code loader 220 analyzes or optimizes the memories by discarding all unused microinstructions prior to writing new microinstructions. In all embodiments, code loader 220 ensures that the addresses stored in microcode data memory 134 are updated, and the microinstructions are removed from microcode instruction memory 132.

In an embodiment, code loader 220 polls microcode instruction memory 132 and/or microcode data memory 134 at a periodically scheduled rate to determine if the memories have exceeded their respective memory capacities or a predetermined threshold. In an alternative embodiment, microcode instruction memory 132 and/or microcode data memory 134 notifies code loader 220 upon reaching a predetermined threshold. In another embodiment, code loader 220 tracks the capacities of microcode instruction memory 132 and/or microcode data memory 134 as code loader 220 loads data into each respective memory. Hence, the present invention supports dynamic code loading to ensure the microinstructions and related data are available for microcode processor 130 when they are needed, but can be removed to make room for other information when the microinstructions and related data are not needed. Additionally, when code loader 220 builds a buffer to transfer microinstructions to microcode instruction memory 132, code loader 220 is aware of the microinstructions that are currently residing in microcode instruction memory 132. Therefore, code loader 220 only selects the microinstructions that need to be transferred.

In an embodiment, code loader 220 constructs or revises one or more path tables that are used to manage the memory pool within microcode instruction memory 132 and microcode data memory 134. A path table (as described in further detail below in reference to FIG. 5) includes various information about the microinstructions to enable code loader 220 to quickly determine the current location of a set of microinstructions. The path table includes other attributes about the microinstructions, such as size, loading state, logical relations, and/or the like, as discussed in further detail below.

FIG. 1 and FIG. 2 are conceptual illustrations of microcode management system 100 and microcode manager 116, respectively, that allow an easy explanation of the present invention. That is, one or more of the blocks can be performed by the same piece of hardware or module of software. It should also be understood that embodiments of the present invention can be implemented in hardware, firmware, software, or any combination thereof. In such an embodiment, the various components and steps would be implemented in hardware, firmware and/or software to perform the functions of the present invention.

III. Phase Module Sequencing

To render an image in a computer graphics environment, primitives are used to render a model representing the object that is being drawn. The primitives can be drawn in a variety of modes that are set by a user. A user can be a human operator (not shown), application software 112, system software 114, or the like. Each mode set by the user can be broken-down into one or more phases used to control all fundamental graphical operations in two or three dimensional environments.

Figure 3:
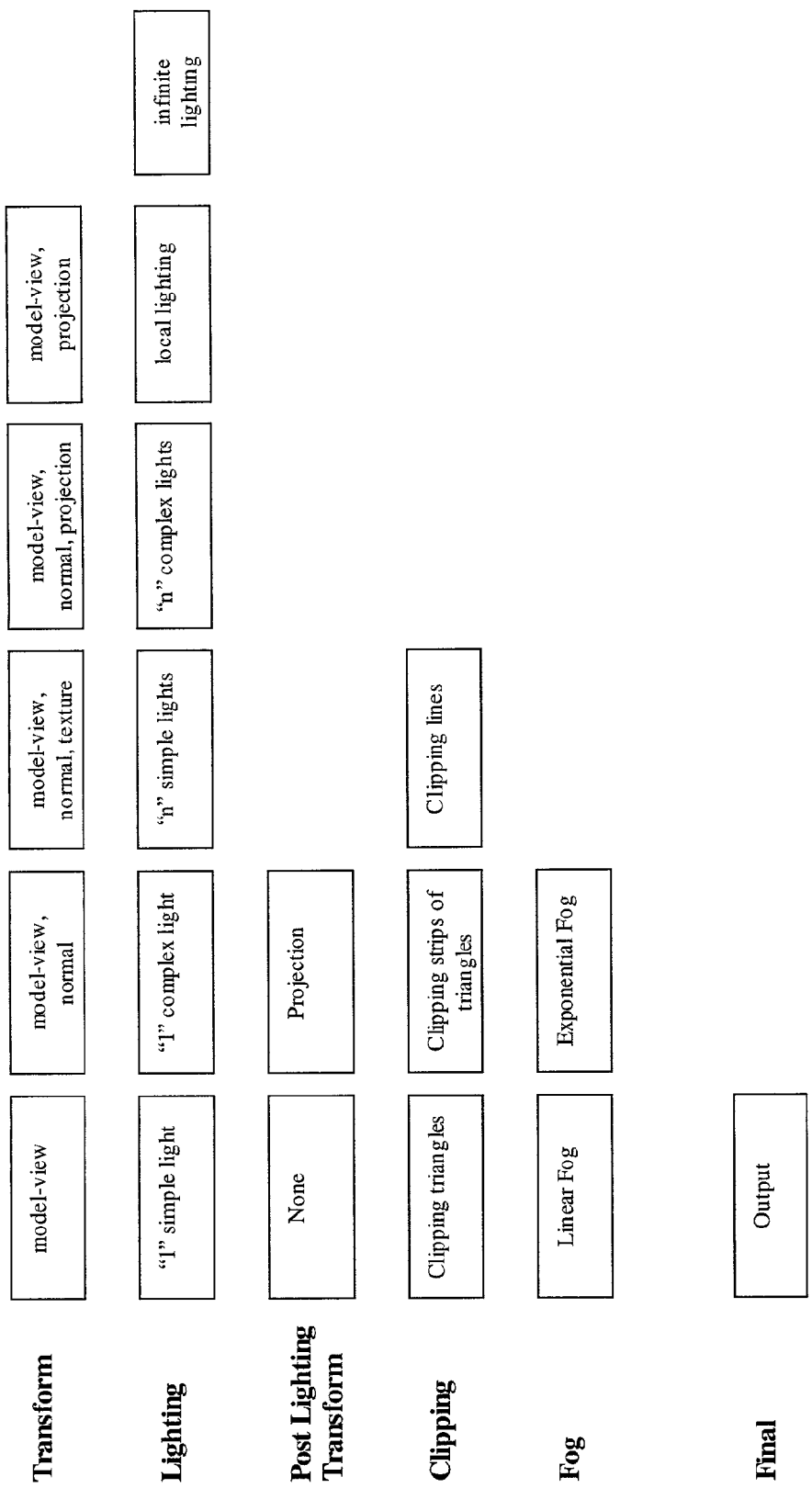
FIG. 3 shows exemplary phase modules according to an embodiment of the present invention.

FIG. 3 illustrates an exemplary compilation of phases (also referred to as "groups") used in a graphics environment. The phases include transformation, lighting, post lighting transformation, clipping, fog, and final. Each phase includes one or more sub-phases. The sub-phases (also referred to as "phase modules" or "functions") specify the microinstructions for implementing the respective phase or certain attributes of the phase. For example, the fog phase includes phase modules to perform calculations to implement a linear fog or exponential fog effect. Another phase is clipping which is used to fit corresponding primitives into a specified region. The clipping phase includes phase modules to instruct microcode processor 130 for clipping triangles, clipping strips of triangles, or clipping lines.

FIG. 3 also includes two types of phase modules for the post lighting transformation phase. One phase module contains microinstructions for implementing no post lighting transformation. The second phase module contains microinstructions for implementing a post lighting projection transformation.

The lighting phase includes a phase module for a single, simple light and a phase module for a single, complex light. The lighting phase also contains a phase module for multiple (i.e., "n") simple lights, as well as a phase module for multiple complex lights. Phase modules for local or infinite lighting are also provided.

The transformation phase modules contain microinstructions to implement a model view, normal, texture, projection, or a combination thereof. Although five combinations are shown, any combination or singularly selected view can be used.

The final output phase module is used to instruct microcode processor 130 to suspend or cease processing, or send the results of the microcode processing to auxiliary processor 140. Each module contains, or is associated with, instructions or a pointer to direct microcode processor 130 to read or process the microinstructions in the next module, except the output phase module.

The phases and sub-phases presented in FIG. 3 are illustrative and are not intended to limit the present invention. Other phases, sub-phases or a combination thereof can be used as would be apparent to one skilled in the relevant art(s).

The phase modules, containing microinstructions for a phase or sub-phase, are stored in phase code depository 122. In an embodiment, the phase modules are prefabricated, tuned and stored in phase code depository 122 to be subsequently selected by sequence identifier 218. In another embodiment, the phase modules are generated by sequence identifier 218 in real time or near term, and transferred to phase code depository 122. In both embodiments, sequence identifier 218 selects a correct phase module or a sequence of phase modules (collectively referred to as a "phase module sequence") to implement a desired mode.

The phase modules (excluding the output phase module) are interchangeable and capable of being synthesized in any order to implement a desired mode. However, some phase modules are order dependent and must be executed in a predetermined sequence. In this case, a group of order-dependent phase modules would be interchangeable and capable of being synthesized in any order with respect to other phase modules or groups of order-dependent phase modules.

Typically in computer graphics, the user supplies function calls to set the vertices, normals, primitives, textual coordinates, other operations, or the like to render an image. These function calls also specify the mode for rendering an image, and are, therefore, referred to as mode commands. As such, a mode command is a request to either initiate or create one or more designated graphics modes, or change a current graphics mode.

To create or change a mode, microcode manager 116 would generate, identify or retrieve a sequence of phase modules based on a mode command. As discussed, the phase modules contain the microinstructions for implementing a specific phase or sub-phase. Since a mode consists of one or more designated phases or sub-phases, a phase module sequence can be produced to identify the requisite microinstructions to implement the phases or sub-phases for the desired mode.

Figure 4A:
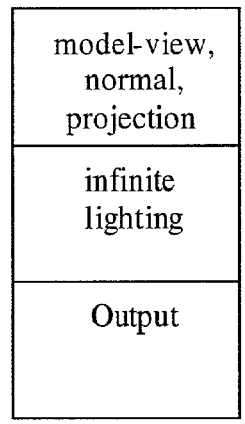
FIG. 4a shows an exemplary phase module sequence according to an embodiment of the present invention.

FIG. 4a shows an example of a phase module sequence according to the present invention. This phase module sequence can be the by-product of a mode command to turn off texture transformation, turn on lighting, use infinite lighting, and turn off fog effects. By analyzing the mode command, sequence identifier 218 would determine that a normal transform phase module is needed because the lighting is turned on. It would also combine the normal transform phase module with the phase modules for model-view and projection transform since the lighting has been specified to be infinite. The infinite lighting phase module is also included to produce infinite lighting effects. Since fog has been turned off, no fog phase modules are needed. Finally, an output module is added to complete the phase module sequence. Hence, the phase module sequence would be assembled as "model-view, normal, projection transformation," "infinite lighting," and "output," as shown in FIG. 4a.

Figure 4B:
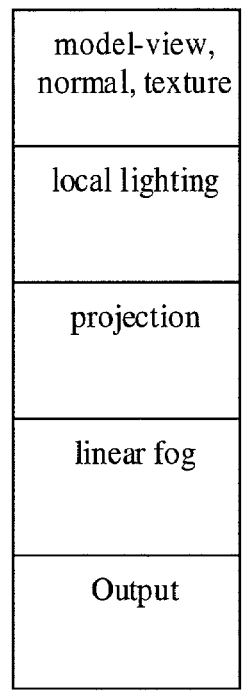
FIG. 4b shows an exemplary phase module sequence according to a second embodiment of the present invention.

A phase module sequence produced from a second mode command is shown in FIG. 4b. This mode command requests a processor to turn on texture transformation and lighting, use local lighting, and turn on linear fog effects. This mode command would be analyzed to select model-view and projection transformation phase modules because model-space vertices would be needed to support local lighting. The local lighting phase module would be included. A normal transformation phase module is also needed since lighting is turned on. A texture transformation phase module would be included since texture transformation is turned on. A phase module for post lighting projection transformation is required because local lighting has been requested. Finally, a linear fog phase module and output phase module are added. As such, the phase module sequence would be "model-view, normal, texture transformation," "local lighting," "post lighting projection transformation," "linear fog," and "output," as shown in FIG. 4b. In this way, according to the present invention, microcode memory savings can be realized and efficiency improved. Microcode instruction memory 132 and microcode data memory 134 need only store and process the selected phase module sequence. Other phase modules which are not selected need not be loaded into microcode instruction memory 132.

IV. Phase Module Attributes

Figure 5A:
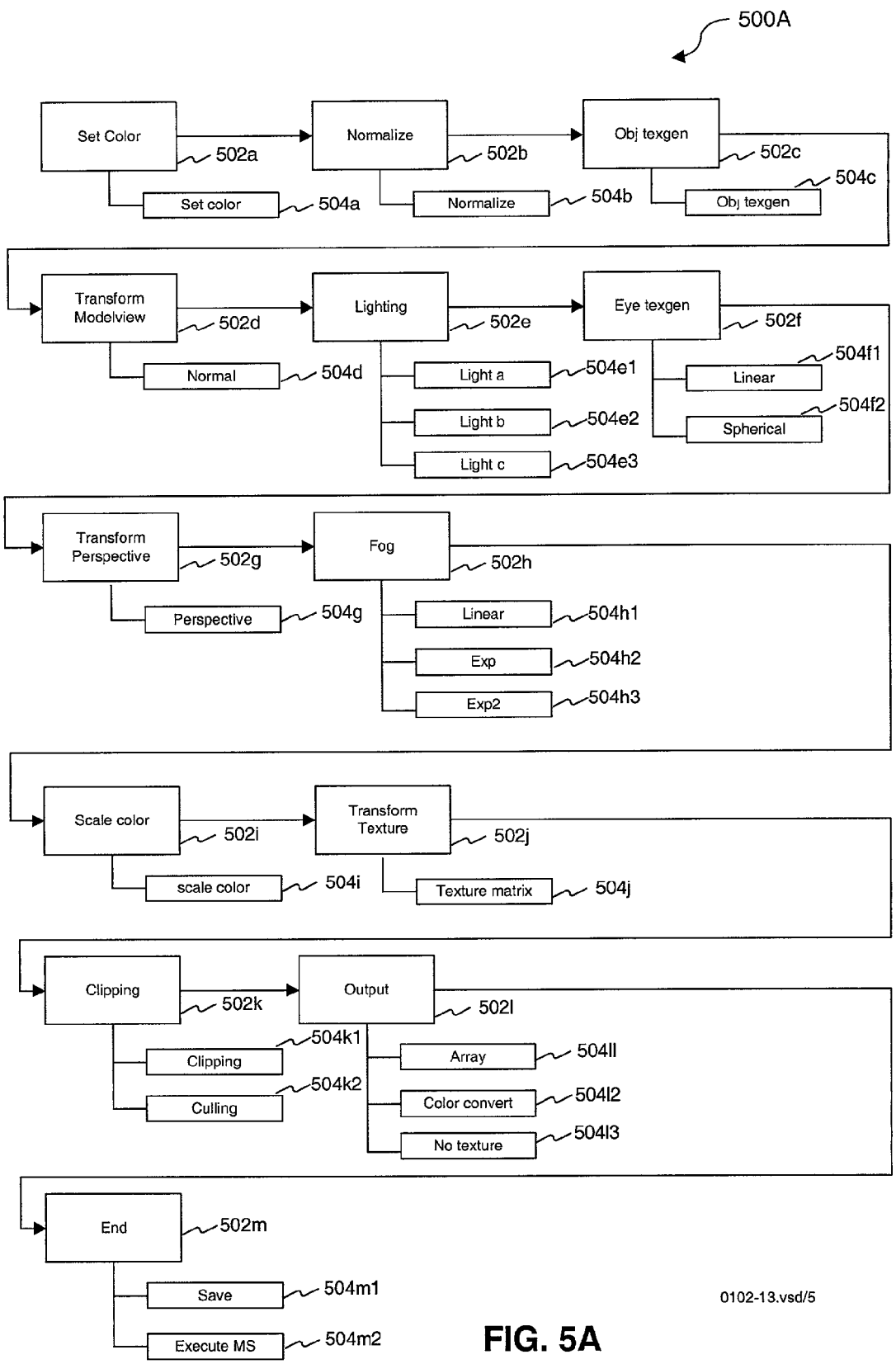
FIG. 5a shows exemplary phase modules according to a third embodiment of the present invention.
Figure 5B:
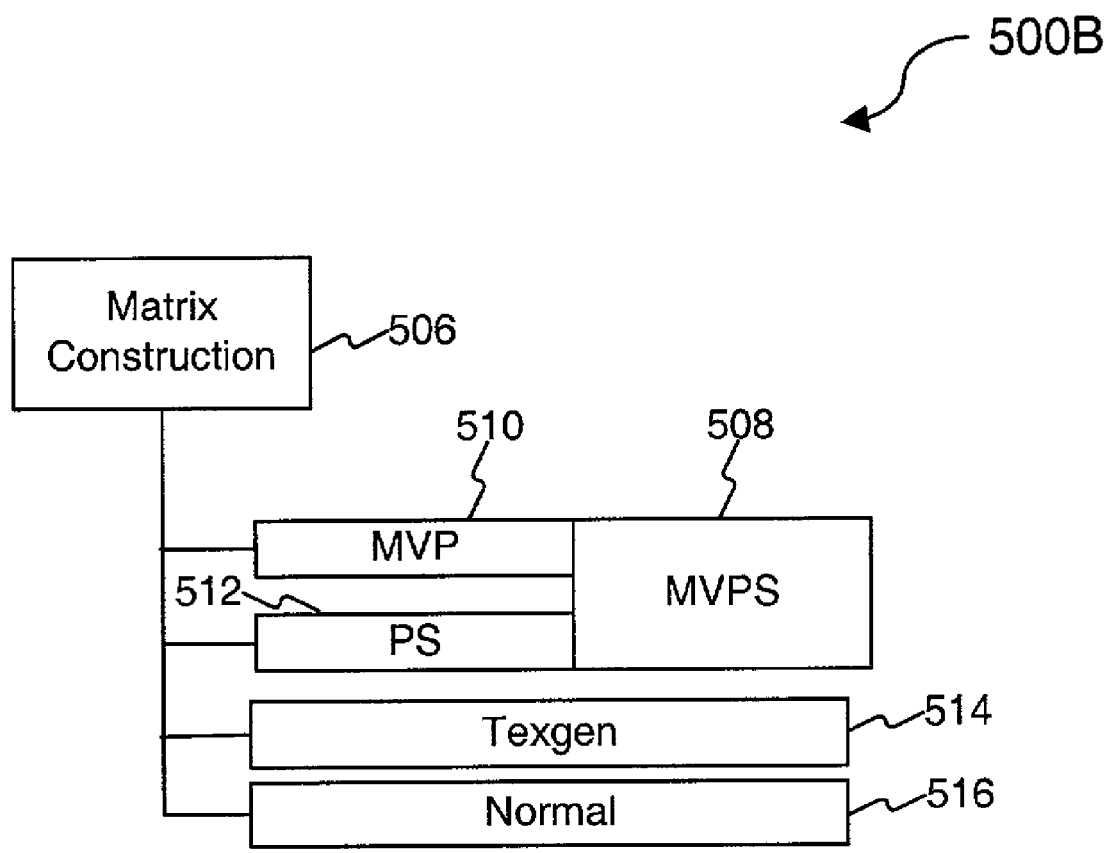
FIG. 5b shows exemplary phase modules according to a fourth embodiment of the present invention.

FIG. 5a and FIG. 5b illustrate phase modules according to another embodiment of the present invention. More specifically, FIG. 5a shows a graphics pipeline 500A containing a plurality of phases or groups 502 (shown as 502a–502m), and a plurality of functions or phase modules 504 (shown as 504a–504m2). Hence, each phase module 504 contains the microinstructions executed by microcode processor 130 to implement a sub-phase of a phase 502. For example, Fog phase 502h contains three phase modules 504h1–504h2. Phase module 504h1 includes the microinstructions for computing the fog calculations to implement a linear fog effect. Phase module 504h2 includes the microinstructions for implementing an exponential fog effect, and phase module 504h2 includes the microinstructions for exponential square effects.

FIG. 5b shows a pre-path graphics pipeline 500B that contains a group module 502 (shown as 506) and a plurality of phase modules 504 (shown as 508–516). The phase modules 504 include a model-view, perspective (or projection) and screen (MVPS) module 508, a model-view and perspective (MVP) module 510, a perspective and screen (PS) module 512, a texgen module 514, and a normal module 516. The matrix construction group module 506 provides the key for calling the microinstructions of phase modules 508–516. As discussed in detail below, pre-path graphics pipeline 500B is used to prepare data for the primary graphics pipeline 500A.

FIG. 5a and FIG. 5b are provided for illustrative purposes and are not intended to limit the present invention. Other phases, sub-phases or a combination thereof can be used as would be apparent to one skilled in the relevant art(s). In an embodiment, microcode manager 116 permits a user to added a new phase module 504 to increase the functionality of a specific group 502 or add an entirely new group 502. In an embodiment, a user can instruct microcode manager 116 to delete a phase module 504 or an entire group 502. In another embodiment, microcode manager 116 permits a user to modify the microinstructions and/or related data associated with the microinstructions, as required.

The related data associated with the microinstructions is referred to as metadata. Each phase module 504 contains or is associated with metadata that establishes the attributes for the phase modules 504. The metadata resides in a header coupled to each phase module. Alternatively, the metadata resides in separate file, table or directory, that is associated with one or more phase modules 504.

The present invention allows the metadata to be used to define various types of attributes. The attributes include a phase module identifier that uniquely identifies each phase module 504, and a group identifier that identifies the assigned group 502. Another attribute is a loading state that indicates whether the respective phase module 504 is currently loaded into microcode processor 130 or auxiliary processor 140. The attributes also include an address for the respective phase module 504. A source address is used to designate the host address for the phase module 504. The host address is the location of the phase module 504 in phase code depository 122; however, a phase module 504 can also be stored in other memory areas or storage mediums (such as, a hard disk drive, CD-ROM, etc.) as would be apparent to one skilled in the relevant art(s). A destination address is used to designate the location of the phase module 504 in microcode processor 130, microcode instruction memory 132, or auxiliary processor 140. In a multiple processing environment having a plurality of microcode processors 130, the destination address indicates the location of the phase module 504 in the respective microcode processor 130.

The metadata also describes the logical relationship of a phase module 504 with another phase module 504. Specifically, the metadata stipulates which phase modules 504 can or cannot be concatenated or executed with another phase module 504. The metadata also stipulates which phase modules 504 must be concatenated or executed with a specific phase module 504.

In an embodiment, the metadata also includes a descriptor that provides a brief description of the functionality of a respective phase module 504. The description also summarizes the purpose and properties. The data contained in the descriptor facilitates the ability for a user to analyze or edit a phase module 504.

A phase module type is also stipulated in the metadata. If designated as a static phase module, the phase module 504 always resides in microcode instruction memory 132. A static phase module is never overwritten or discarded by code loader 220 during a dynamic code loading operation. Additionally, a static phase module resides at a known address inside microcode instruction memory 132.

Another phase module type is a shared phase module. A shared phase module has several functions that use the same code base or share part of the same code. A shared phase module is treated as one module function whenever a load operation needs to get placed. When building a phase code sequence, the needed function will be retrieved from the shared phase module. Referring back to FIG. 5b, MVPS module 508 is a shared phase module having functions interlaced with two branch functions, namely MVP module 510 and PS module 512. Branch functions share part of the microinstructions residing in the shared phase module. In FIG. 5b, MVP module 510 and PS module 512 share the microinstructions within MVPS 508 that are pertinent to preparing or processing the transformation data. A shared phase module can be overwritten or discarded by code loader 220 during dynamic code loading. The metadata associated with a shared phase module is used to track the address of the shared phase module inside microcode instruction memory 132.

A third phase module type is a volatile phase module. A volatile phase module can be overwritten or discarded by code loader 220 during dynamic code loading. However, a volatile phase module cannot be shared. Code loader 220 would read the loading state field to determine the location of a volatile phase module. The metadata associated with a volatile phase module is used to track the address of the volatile phase module inside microcode instruction memory 132.

Figure 6:
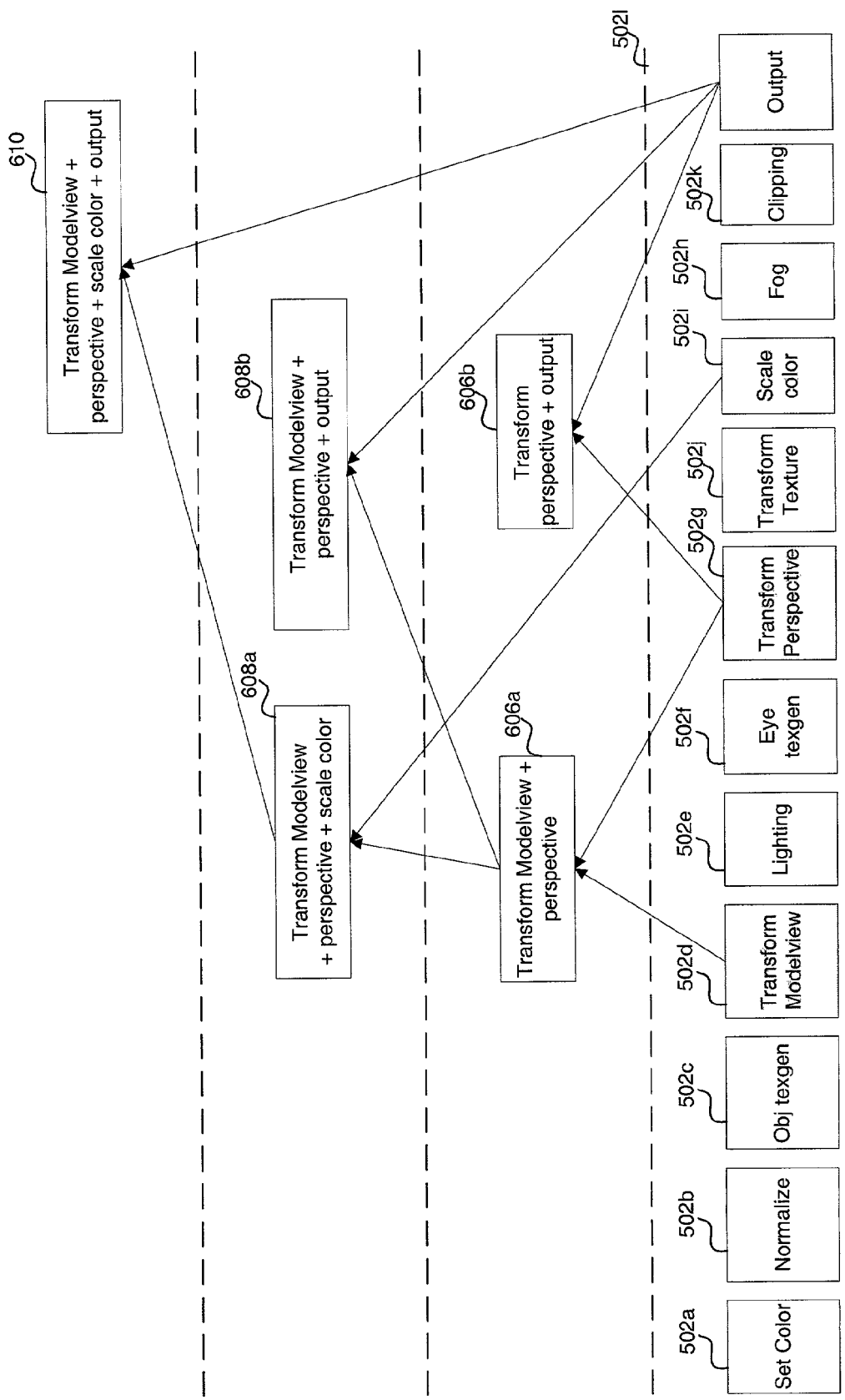
FIG. 6 shows exemplary generic groups and merger groups according to an embodiment of the present invention

Another attribute specified in the metadata is a group type. The present invention supports two groups 502 of phase modules 506. The groups are a generic group and a merger group. FIG. 6 illustrates exemplary generic groups 502a–502l and merger groups 606a–610 according to an embodiment of the present invention. Generic groups 502a–502l represent individual phases or groups 502 as described in reference to FIG. 5.

Merger groups 606a–610 are a combination of two or more generic groups 502a–502l. Merger groups 606a–610 can also be created by concatenating one or more generic groups 502a–502l with one or more other merger groups 606a–610. Additionally, merger groups 606a–610 can be a combination of multiple merger groups 606a–610.

Referring to FIG. 6, merger groups 606a–610 illustrate an embodiment of generic groups 502a–502l that have been concatenated logically. In an embodiment, sequence identifier 218 is configured to validate or optimize the concatenation of a merger group. This is implemented by examining the logical relationships and like restrictions stipulated in the metadata for each group 502.

Merger groups 606a–606b are a combination of two generic groups. Specifically, sequence identifier 218 would concatenate generic group 502*d* and generic group 502*g* to produce merger group 606*a*. Sequence identifier 218 would concatenate generic group 502*g* and generic group 502*l* to produce generic group 606*b*.

Merger groups 608*a*–608*b* include a combination of three generic groups. Merger group 608*a* is a combination of merger group 606*a* and generic group 502*i*. Merger group 608*b* is a combination of merger group 606*a* and generic group 502*l*.

Merger group 610 includes a combination of four generic groups. Specifically, merger group 610 is a combination of generic group 502*l* and merger group 608*a*.

V. System Operation

Figure 7:
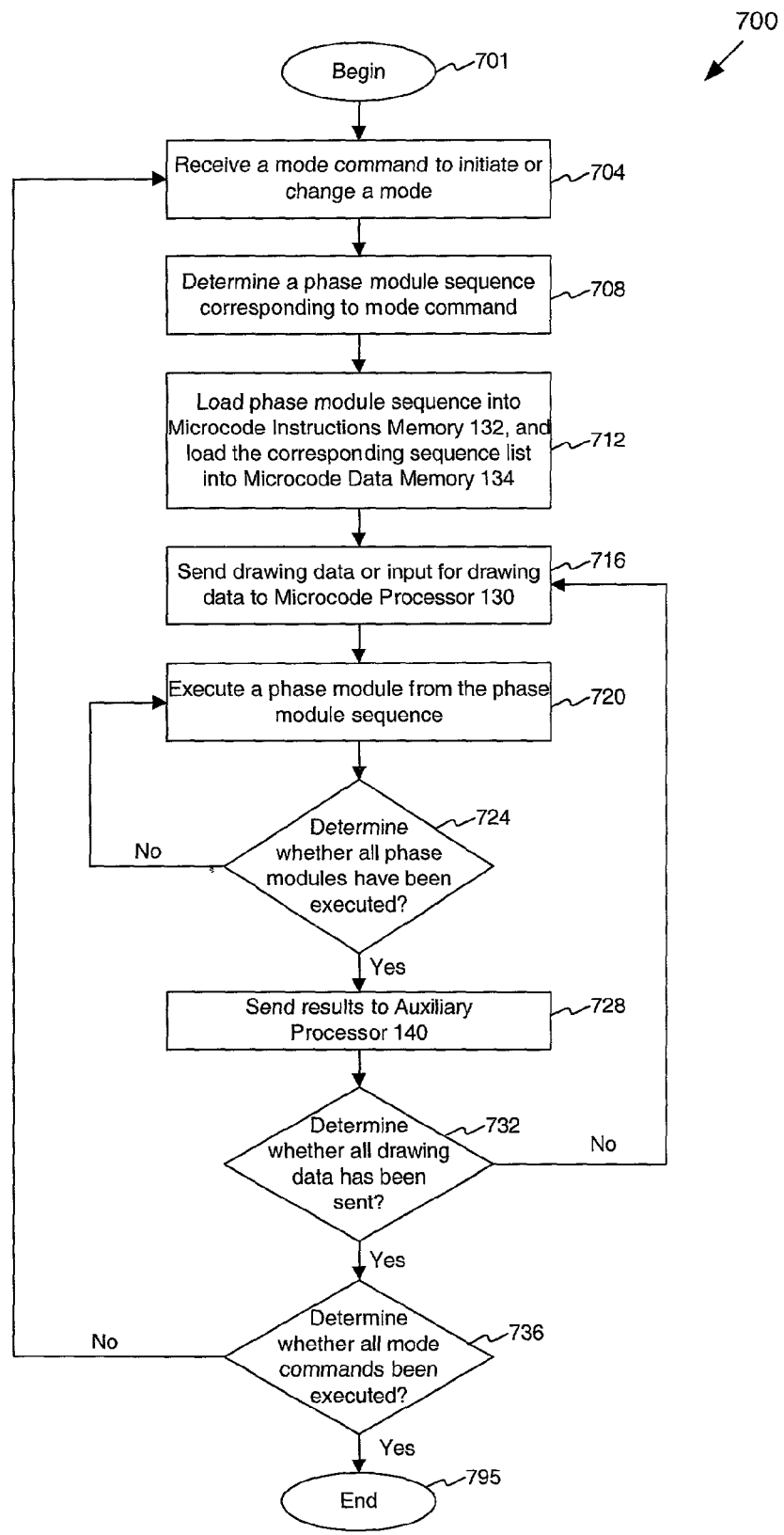
FIG. 7 illustrates an operational flow diagram for the steps involved in managing the utilization of microcode according to an embodiment of the present invention.

Referring to FIG. 7, flowchart 700 represents the general operational flow of an embodiment of the present invention. More specifically, flowchart 700 shows an example of a control flow for managing the utilization of microcode in system 100. For convenience, the operation of the control flow in FIG. 7 is described with respect to the examples of FIG. 4*a* and FIG. 4*b*. However, this control flow is not necessarily limited to the examples of FIG. 4*a* and FIG. 4*b*.

Referring to FIG. 7, the control flow of flowchart 700 begins at step 701 and passes immediately to step 704. At step 704, mode detector 212 detects a mode command from the user (e.g., application software 112, system software 114, or a human operator). The mode command is a request to either initiate or create a designated graphics mode, or change a current mode.

At step 708, mode detector 212 sends a signal to sequence identifier 218 to instruct it to generate, identify or determine a phase module sequence corresponding to the mode command. In an embodiment, sequence identifier 218 analyzes the mode command to determine the microcode requirements for implementation. Afterwards, code loader 220 would query phase code depository 122 to select one or more phase modules matching the microcode requirements. An example of the results of such a query are shown in the phase code sequences of FIG. 4*a* and FIG. 4*b*.

In an embodiment, sequence identifier 218 constructs a path table for the phase module sequence. The path table contains various metadata associated with each phase module, including its purpose, properties and location. Sequence identifier 218 uses the path table to validate and/or optimize the phase module sequence. The present invention supports several types of validation techniques or methodologies. One type of validation is state validation. During state validation, sequence identifier 218 determines the loading state of each phase module within the phase module sequence. State validation occurs whenever a new mode requires the addition of a new phase module. State validation is not required to be implemented each time a parameter for a phase module changes.

A second type of validation is prepath validation. Referring back to FIG. 5*b*, prepath pipeline 500B is used to implement the microinstructions for prepath validation in an embodiment. Prepath validation is used to preprocess data for the phase module sequence. Prepath validation can be used to calculate values that will be used more than once.

A third type is path validation which is used to build the actual phase module sequence that will be communicated to code loader 220 and executed by microcode processor 130. Sequence identifier 218 analyzes each phase and its associated metadata to choose the optimal phase module. During this phase, sequence identifier 218 identifies which phase modules (or functions) are needed per phase (or group). Additionally, sequence identifier 218 determines if a faster version (or merger group) of the generic phase module sequence exists and is valid based on the requested mode command. Sequence identifier 218 uses a merger group(s) when possible to optimize microcode processing.

Referring back to FIG. 7 at step 712, the selected or identified phase code sequence is copied and/or transferred to microcode instruction memory 132. In an embodiment, code loader 220 receives a path table after it has been validated by sequence identifier 218. Code loader 220 updates or reconciles the path table to verify the current state and addresses of the specified phase modules. Dynamic code loading can be implemented to ensure that unused phase modules are discarded. Code loader 220 can also ensure that duplicate phase modules are not loaded into microcode instruction memory 132.

In addition to loading the phase code sequence into microcode instruction memory 132, code loader 220 also loads a corresponding sequence list into microcode data manager 134. The sequence list contains the memory addresses to the phase modules stored in microcode instruction memory 132. Therefore, when the phase module sequence is executed by microcode processor 130, the sequence list would instruct microcode processor 130 where to find the requisite microinstructions. The sequence list can be a copy of the path table or a subset of data from the path table.

At step 716, mode detector 212 is notified that the phase module sequence has been identified and properly loaded into microcode instruction memory 132. Mode detector 212 would then instruct drawing data processor 214 to send the related drawing data to microcode processor 130. The drawing data includes a set of vertices and vertex data (e.g., coordinates, colors, normals, texture coordinates, edge flags or the like) used to draw primitives for an image. In another embodiment, code loader 220 notifies drawing data processor 214 after the phase module sequence has been loaded, without having to interact with mode detector 212.

After microcode processor 130 receives the drawing data, a signal is sent to notify phase executor 216 from either mode detector 212 or drawing data processor 214. At step 720, phase executor 216 sends a signal to microcode processor 130 to command it to execute the phase module sequence designated in microcode instruction memory 132. Referring back to the example of FIG. 4*a*, microcode processor 130 would start by executing the microinstructions in the "model-view, normal, projection transformation" phase module. Microcode processor 130 uses the microinstructions to process all the vertices in the drawing data. The last line of code in this phase module instructs microcode processor 130 to read the next module. At step 724 in FIG. 7, microcode processor 130 would read the last line, and at step 720, would execute the microinstructions in the next phase module in FIG. 4*a*, entitled "infinite lighting." This process is repeated, once again, when microcode processor 130 reads the last line of the "infinite lighting" phase module, and initiates execution of the "output" phase module. The last line in the "output" phase module instructs microcode processor 130 that there are no more phase modules in this phase module sequence.

Referring back to FIG. 7, at step 728, the "output" phase module of FIG. 4*a* instructs microcode processor 130 to send the results of the microcode processing to auxiliary processor 140. Auxiliary processor 140 would use the results for further microcode processing, pixel processing, or the like.

At step 732, drawing data processor 214 is notified that all phase modules for the drawing data has been executed. If additional drawing data is available for the current mode, the control flow passes back to step 716 and drawing data processor 214 would forward the drawing data to microcode processor 130. As a result, the phase module sequence is executed to implement the designated mode for the drawing data.

If, on the other hand, no additional drawing data is required to be processed, the control flow passes to step 736. At step 736, mode detector 212 determines or verifies whether all mode commands have been executed or whether any new mode commands have been received for execution. State variables used to track mode changes, drawing data or the like can be stored in primary memory 120 or microcode data memory 134. If additional mode commands are present, the control flow passes back to step 704. Otherwise, the control flow ends as indicated by step 795.

VI. Software and Hardware Embodiments

The present invention can be implemented using hardware, firmware, software or a combination thereof and can be implemented in one or more computer systems or other processing systems. In fact, in an embodiment, the present invention is directed toward one or more computer systems capable of carrying out the functionality described herein.

Figure 8:
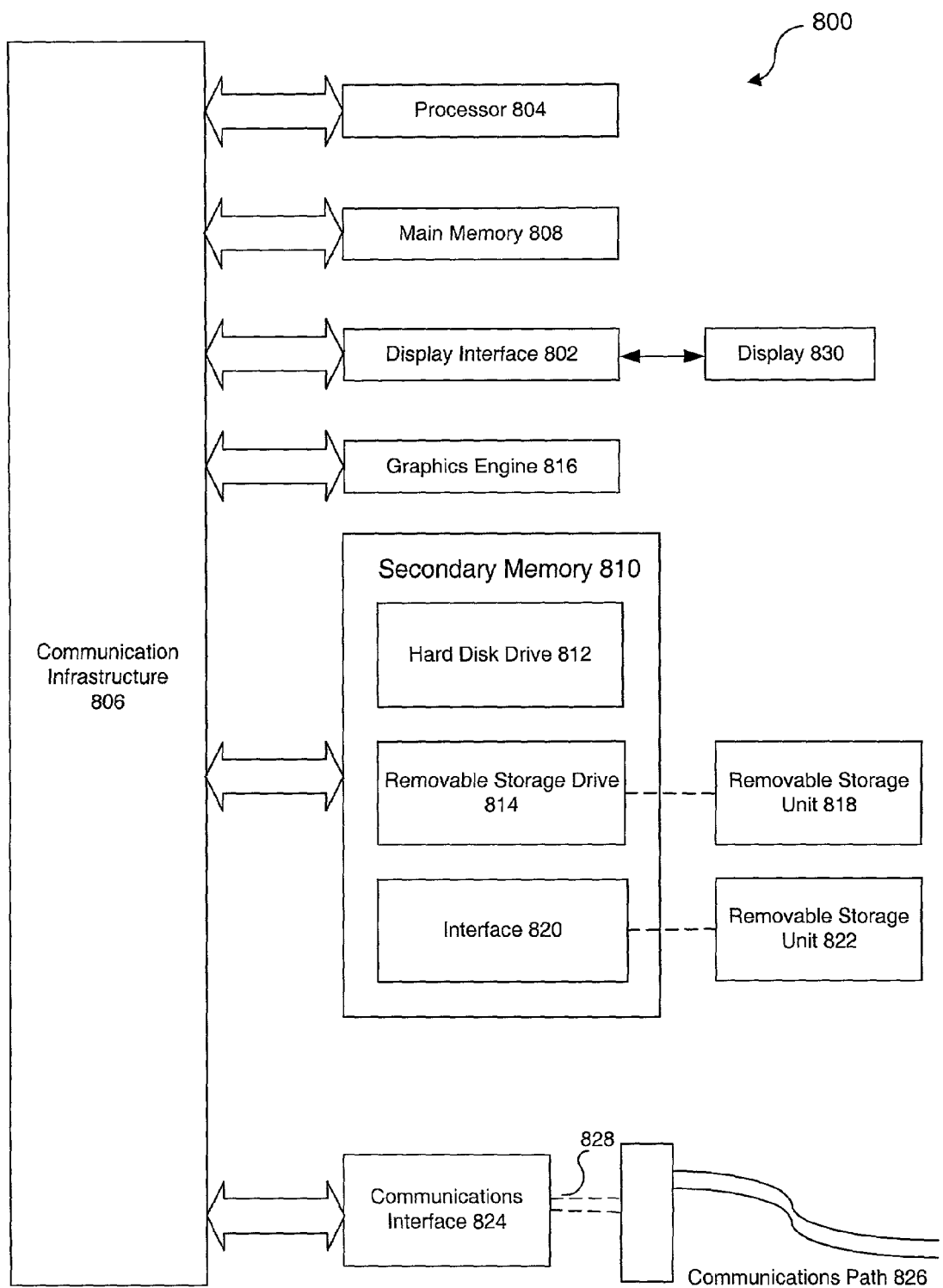
FIG. 8 illustrates a block diagram of an example computer system useful for implementing the present invention.

Referring to FIG. 8, computer system 800 is used to show an example environment in which the present invention can operate. Computer system 800 can include any type of computer graphics computer, virtual machine, processor (single bus, multiple bus, or bus-less processor(s)), workstation, and network architecture. In an embodiment, an OpenGL® machine can be used including, but not limited to, graphics workstations manufactured by Silicon Graphics, Inc.

Computer system 800 includes one or more processors, such as processor 804 and graphics engine 816. Graphics engine 816 can be implemented as one or more processor chips. Graphics engine 816 can be included as a separate processor as shown in FIG. 8, or as part of processor 804.

For example, processor 804 can carry out the operations of one or more of central processor 110, microcode processor 130 and auxiliary processor 140 (shown in FIG. 1). Similarly, graphics engine 816 can carry out the operations of one or more of microcode processor 130 and auxiliary processor 140.

Processor 804 and graphics engine 816 are connected to a communication infrastructure 806 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 800 can include a display interface 802 that forwards graphics, text, and other data from the communication infrastructure 806 (or from a frame buffer not shown) for display on the display unit 830.

Computer system 800 also includes a main memory 808, preferably random access memory (RAM), and can also include a secondary memory 810. For example, referring back to FIG. 1, primary memory 120, microcode instruction memory 132, microcode data memory 134 can be a component of either main memory 808 or secondary memory 810.

Secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. which is read by and written to removable storage drive 814. As will be appreciated, the removable storage unit 818 includes a computer usable storage medium having stored therein computer software and/or data.

In alternative embodiments, secondary memory 810 can include other similar means for allowing computer programs or other instructions to be loaded into computer system 800. Such means can include, for example, a removable storage unit 822 and an interface 820. Examples of such can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 can also include a communications interface 824. Communications interface 824 allows software and data to be transferred between computer system 800 and external devices. Examples of communications interface 824 can include a modem, a network interface (such as an Ethernet card), a communications port, a PCM-CIA slot and card, etc. Software and data transferred via communications interface 824 are in the form of signals 828 which can be electronic, electromagnetic, optical or other signals capable of being received by communications interface 824. These signals 828 are provided to communications interface 824 via a communications path (i.e., channel) 826. This channel 826 carries signals 828 and can be implemented using wire or cable, fiber optics, a phone line, a cellular phone link, an RF link and other communications channels.

In this document, the terms "computer program medium" and "computer usable medium" are used to generally refer to media such as removable storage drive 814, a hard disk installed in hard disk drive 812, and signals 828. These computer program products are means for providing software to computer system 800. The invention is directed to such computer program products.

Computer programs (also called computer control logic) are stored in main memory 808 and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software can be stored in a computer program product and loaded into computer system 800 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VII. CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above described exemplary embodiments, but should be defined only in accordance with the following claims and their equivalents.

What is claimed is:

1. A method for managing microcode, comprising the steps of:
   evaluating a mode command to initiate or change a mode;
   selecting a combination of functions and a sequence list forming a logical sequential concatenation of said functions, each function including microinstructions that, when executed, implement a phase or a sub-phase of said mode,
      wherein said selecting said sequence list includes validating or optimizing said sequence list, wherein said validating or optimizing comprises searching for a faster version of a first partial sequence list selectable for said sequence list, wherein said faster version is a second partial sequence list; and
   delivering said combination to a microcode processor according to said sequence list.

2. A method according to claim 1, wherein said selecting step further comprises the step of:
   querying a storage medium to select said combination.

3. A method according to claim 1, further comprising the step of:
   loading said combination into a microcode instruction memory.

4. A method according to claim 1, further comprising the step of:
   loading said sequence list into a microcode data memory, wherein said sequence list includes a memory address to said combination.

5. A method according to claim 1, further comprising the step of:
   executing said combination to implement said mode.

6. A method according to claim 5, further comprising the steps step of:
   sending a result from said executing step to a processor for pixel processing or additional microcode processing.

7. A method according to claim 1, further comprising the step of:
   sending drawing data to a microcode processor prior to said executing step.

8. A method according to claim 1, further comprising the step of:
   sending drawing data to a microcode processor to render three dimensional graphics.

9. A method according to claim 1, further comprising the step of:
   sending drawing data to a microcode processor to render an animation scene.

10. A method according to claim 1, further comprising the step of:
    sending drawing data to a microcode processor to render a scene for a video game.

11. A system for managing microcode, comprising:
    a mode detector for evaluating a mode command to initiate or change a mode; and
    a sequence identifier for selecting a combination of functions and a sequence list forming a logical sequential concatenation of said functions, each function including microinstructions that, when executed, implement a phase or a sub-phase of said mode, wherein said sequence identifier is adapted to validate or optimize said sequence list by searching for a faster version of first partial sequence list selectable for said sequence list, wherein said faster version is a second partial sequence list.

12. A system of claim 11, further comprising:
    a code loader for loading said combination into a microcode instruction memory.

13. A system of claim 11, further comprising:
    a phase executor for commanding a microcode processor to execute said combination.

14. A system of claim 11, further comprising:
    a drawing data processor for sending drawing data or input for drawing data to a microcode processor in response to said mode command.

15. A system of claim 11, further comprising:
    a drawing data processor for sending drawing data or input for drawing data to a microcode processor to render a three dimensional model in response to said mode command.

16. A system of claim 11, further comprising:
    a drawing data processor for sending drawing data or input for drawing data to a microcode processor to render an animation scene in response to said mode command.

17. A system of claim 11, further comprising:
    a microcode data memory for storing said sequence list specifying a memory address to said combination.

18. A computer program product comprising a computer useable medium having computer readable program code means embedded in said medium for causing an application program to execute on a computer used to manage microcode, said computer readable program code means comprising:
    first computer readable program code means for causing the computer to evaluate a mode command to initiate or change a mode;
    second computer readable program code means for causing the computer to select a combination of functions and a sequence list forming a logical sequential concatenation of said functions, each function including microinstructions that, when executed, implement a phase or a sub-phase of said mode; and
    third computer readable program code means for causing the computer to produce a validated or optimized said sequence list, wherein said third computer readable program code means includes computer readable program code means for causing the computer to search for a faster version of a first partial sequence list selectable for said sequence list, wherein said faster version is a second partial sequence list.

19. A computer program product according to claim 18, wherein said second computer readable program code means loads said combination into a microcode instruction memory.

20. A computer program product according to claim 18, further comprising:
    fourth computer readable program code means for causing the computer to command a microcode processor to execute said combination.

21. A computer program product according to claim 18, further comprising:

fourth computer readable program code means for causing the computer to send drawing data or input for drawing data to a microcode processor in response to said mode command.

22. A computer program product according to claim 18, further comprising:
   fourth computer readable program code means for causing the computer to send drawing data or input for drawing data to a microcode processor to render three-dimensional graphics in response to said mode command.

23. A computer program product according to claim 18, further comprising:
   fourth computer readable program code means for causing the computer to store said sequence list specifying a memory address to said combination.

24. A method for managing microcode, comprising the steps of:
   accessing a library of functions, each function including microinstructions that, when executed, implement a phase or a sub-phase of a graphics mode;
   selecting a combination of functions from said library and a sequence list forming a logical sequential concatenation of said functions in response to a mode command to produce a desired mode mode;
      wherein said selecting said sequence list includes validating or optimizing said sequence list, wherein said validating or optimizing comprises searching for a faster version of a first partial sequence list selectable for said sequence list, wherein said faster version is a second partial sequence list;
   delivering said combination to a processor;
   delivering drawing data to said processor; and
   executing said combination to process said drawing data according to said sequence list and thereby render said desired mode.

25. A method according to claim 24, wherein said validating or optimizing step further comprises:
   selecting a merger group from said library, wherein said merger group includes a combination of microinstructions that, when executed, implement a plurality of phases of a graphics mode.

26. A method according to claim 24, wherein said validating or optimizing step further comprises:
   preprocessing data for said combination to calculate values used repetitively during said executing step.

27. A method according to claim 24, wherein said validating or optimizing step further comprises:
   validating a loading state of a function selected for said combination.

28. A method according to claim 24, wherein said validating or optimizing step further comprises:
   validating one or more of the functions to produce said combination.

* * * * *